Feb. 13, 1940. Y. TODA 2,190,524

ELECTRIC VALVE CONVERTING SYSTEM

Filed Jan. 4, 1939

Inventor:
Yoshiaki Toda,
by Harry E. Dunham
His Attorney.

Patented Feb. 13, 1940

2,190,524

UNITED STATES PATENT OFFICE 2,190,524

ELECTRIC VALVE CONVERTING SYSTEM

Yoshiaki Toda, Tokyo, Japan, assignor to General Electric Company, a corporation of New York Application January 4, 1939, Serial No. 249,294
In Japan January 21, 1938

5 Claims. (Cl. 175—363)

My invention relates to electric valve converting systems and more particularly to such systems for supplying energy from an alternating current circuit to a direct current load circuit.

In electric valve converting and rectifying systems it has been common to use a plurality of phase networks, the mid or neutral points of which were interconnected by means of inductive windings which have also been called interphase transformers. Such inductive windings in the instance of rectifying systems have a voltage which is a function of the load on the rectifier at light load, and which approaches a substantially constant value at the heavier load values. Such an arrangement, which may be called a 2-$n$ phase rectifier operating at normal load as two $n$-phase rectifiers in parallel, tends to become at light load a single 2-$n$ phase rectifier. Such operation causes a rise in voltage on the direct current side of the rectifier due to the fact that the inductive winding or interphase transformer no longer is effective to produce parallel operation of the $n$-phase networks.

In accordance with my invention this rise in voltage at light load values is reduced to a negligible amount by causing such a rectifier to operate as a single $n$-phase rectifier. This is accomplished by supplying two different wave forms to the grids controlling the anodes of the rectifier so that when the load decreases the operation is changed from the parallel two $n$-phase operation to the single $n$-phase operation. The operation of the single $n$-phase rectifier produces a voltage which does not vary substantially from the direct current voltage produced by the rectifier at normal load values.

It is therefore an object of my invention to provide an improved electric valve converting system for transferring energy from an alternating current circuit to a direct current circuit.

Another object of my invention is to provide an improved electric valve rectifying system wherein two parallel operating $n$-phase networks at normal load values are caused to operate as a single $n$-phase network at low load values.

Still another object of my invention is to provide an improved electric valve rectifying system wherein the control voltage applied to the control grids of the rectifier is such that the transmission from low load values to normal load values may occur readily without incurring any unbalance in the operation of the rectifier.

Figure 1:
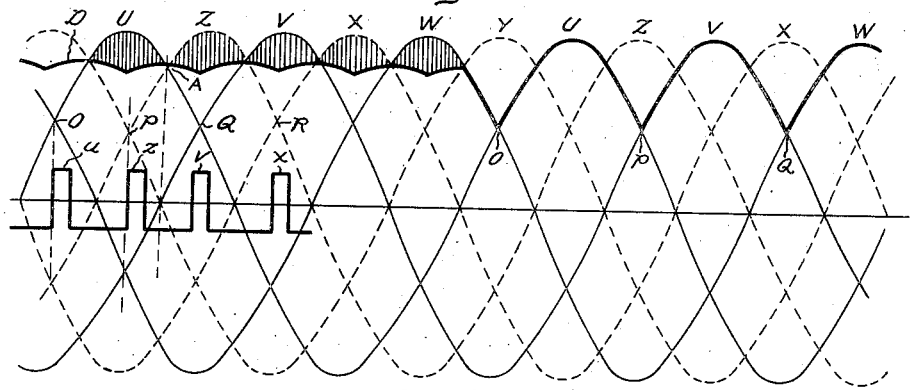
Figure 2:
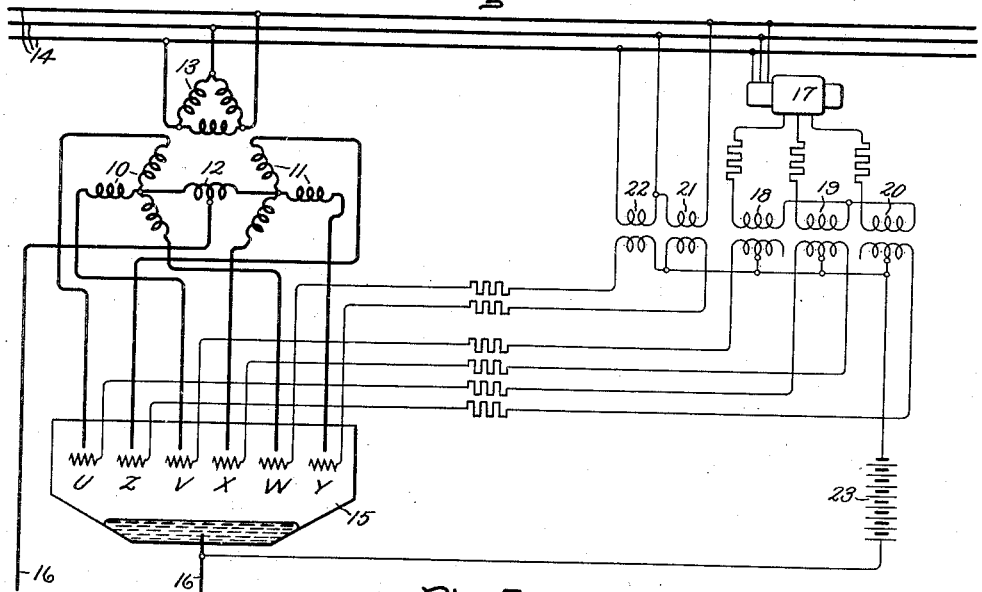
Figure 3:
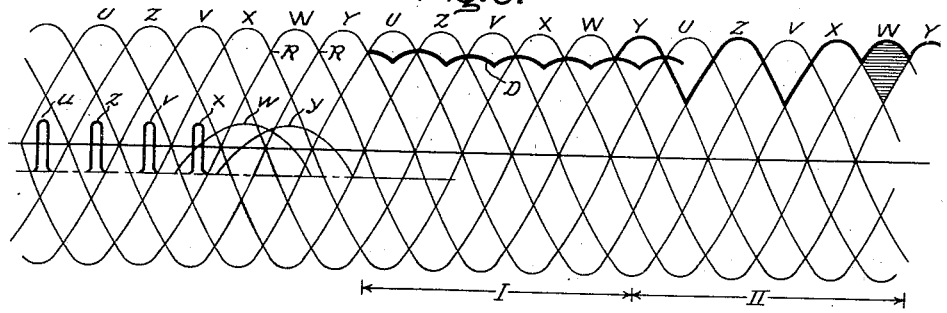

For a better understanding of my invention, together with other and further objects thereof, reference is had to the following description taken in connection with the accompanying drawing in which Fig. 1 is explanatory of the usual operation of two $n$-phase networks interconnected by an inductive winding or interphase transformer, Fig. 2 diagrammatically illustrates the application of my invention to a typical electric valve rectifying system, and Fig. 3 is explanatory of the operation of my system.

Referring more particularly to Fig. 1 of the drawing, there is shown a wave form diagram illustrating the operation of the usual six-phase electric valve converting system which comprises two three-phase networks interconnected by an interphase inductive winding. In this figure it will be assumed that the control electrodes or grids of the rectifier are supplied with peaked or rectangular control voltages such as $u$, $z$, $v$ and $x$, and etc. At normal load values these control voltages cause the respective anodes of the rectifier to become conductive at the points O, P, Q and R so that the direct current output curve may be represented by the solid line D. At light load values, however, the interphase inductive winding in the ordinary rectifier not supplied with peaked or rectangular control voltages, is substantially ineffective and the rectifier will revert to the ordinary six-phase operation. If such change occurs at the point A in Fig. 1 the direct current voltage will be increased by an amount equal to the shaded portions of the curves U, Z, V, X, W, etc. Where, however, as in the present example the rectifier is supplied with peaked or rectangular control voltages the rectifier will tend to operate at light load conditions as a single three-phase rectifier. Thus the anodes will be started at the points O, P and Q, respectively. The remaining anodes whose voltages are represented by the curves Y, Z and X will not start since at the time that control potentials are supplied to the control grids thereof, their anode potential is negative with respect to the anode which is conducting current at that time. Due to the fact that the interphase transformer is substantially ineffective the current does not transfer from the anode U to the anode Z as under normal load conditions, so that single three-phase operation results producing the output wave O, U, P, V, Q and W. This voltage wave, however, is somewhat similar in magnitude to the normal load condition, but the rectifier cannot readily revert back to normal load operating condition because of the ineffectiveness of the interphase inductive winding which on increasing load merely becomes saturated and does not cause the other anodes to become conductive.

In accordance with the present invention a substantial rise in the voltage at light load conditions is obviated without producing unbalanced operation when it is desired to return to normal load condition. This is accomplished by a grid control circuit which supplies to certain of the control grids a control voltage tending to produce six phase or 2-$n$ phase operation and another control voltage which tends to produce three-phase or $n$-phase operation.

The arrangement shown in Fig. 2 shows a typical rectifier embodying my invention and for purposes of simplicity I have elected to show an electric valve rectifier of the type having two three-phase inductive networks 10 and 11 interconnected by an interphase winding 12, and which networks are energized from the primary winding 13 which is connected to the alternating current supply source 14. If desired, the electric valve rectifying system may utilize a plurality of individual valves or, as shown, a single valve having a cathode and a plurality of anodes each anode being provided with a control electrode such as represented by the electric valve device 15. One side of the direct current circuit 16 is connected to the cathode of the electric valve means 15 and the other side of the direct current circuit is connected to an intermediate point on the interphase inductive winding 12. The various anodes of the electric valve device 15 together with their control electrodes have been given the reference characters U, Z, V, X, W and Y, respectively, and the control electrodes of the four anodes U, Z, V and X are energized from a group of control transformers which produce peaked or rectangular control voltages so as to determine accurately the moments of ignition of these various anodes. Such control voltages usually cause the control grids or electrodes to become positive for a relatively short time interval. This group of transformers is energized from the alternating current supply circuit 14 through a suitable phase shifting means 17, the output of which is connected to the control transformers 18, 19 and 20 which may be of the saturable type so as to produce the desired type of control voltages. The other anodes W and Y have control electrodes which are energized from two transformers 21 and 22 which may be energized from the phase shifting means 17 or which may be connected directly to the alternating current supply circuit 14. These transformers 21 and 22 supply to the control electrodes W and Y voltages which are positive for a time interval sufficiently great so as to permit either three-phase or six-phase operation of the rectifier. All of the various transformers 18, 19, 20, 21 and 22 have a common connection through a suitable source of biasing potential 23 to the cathode of the electric valve device 15. The purpose of supplying control voltages of a different type to the control electrodes of the anodes W and Y will become apparent in the following description of the operation of the system.

The operation of the arrangement described in connection with Fig. 2 will become apparent by reference to Fig. 3 which shows the control voltages $u$, $z$, $v$ and $x$ which are peaked or substantially rectangular in form and which are supplied to the control electrodes of the anodes U, Z, V and X, respectively. It will also be noted that the control voltages $w$ and $y$ which are supplied to the control electrodes of the anodes W and Y are substantially sine wave formed and hence maintain the control electrode at a positive potential for a time interval which is relatively great compared to the time interval for which the control electrodes of the anodes U, Z, V and X are maintained at a positive potential. Under normal operating conditions, that is at full loads, the rectifier will tend to operate as a parallel operated rectifier having two three-phase networks. The output curve for such operation is shown by the curve D in portion I of the curve in Fig. 3. At no load or light load conditions the rectifier will operate as a single three-phase rectifier thus producing the output curve shown in portion II of Fig. 3. It will be noted that the control voltages $w$ and $y$, which maintain the control electrode at a positive potential for a relatively long time interval, are effective on one of the anodes of each of the networks 10 and 11. Thus it is immaterial in the operation of the rectifier as to which one of the networks 10 or 11 assumes the operation of a three-phase rectifier at no load or light load conditions, since one of the anodes on the opposite side of the interphase inductive winding 12 will be rendered conductive by these control voltages $w$ or $y$ so as to again permit the interphase inductive winding 12 to become effective when load increases on the direct current 16. These control voltages $w$ and $y$ will become effective relative to the anode voltages W and Y at the point R respectively. From this it will be apparent that by supplying control voltages having a relatively long time interval in which they maintain the control electrodes positive so that at least one anode on each side of the interphase inductive winding receives such voltages, it will permit the rectifier to readily return to the parallel three-phase or six-phase operation.

While I have shown and described my invention in connection with a particular embodiment it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. The combination comprising a source of alternating current, a direct current load circuit, an electric valve rectifier interconnecting said source and said load circuit, said rectifier including at least two polyphase networks having neutrals interconnected by an interphase inductive winding, a group of electric valves for each of said networks, said valves each having a control electrode, a control circuit for said electrodes including means for supplying to one electrode of each group of valves for a predetermined time a potential tending to render conductive the valves thereof and means for supplying to the remaining electrodes of said valves for a time interval which is short relative to said predetermined time potentials tending to render the valves conductive.

2. The combination comprising an alternating current circuit, a direct current load circuit, an electric valve rectifier interconnecting said circuits, said rectifier including at least two polyphase networks having neutrals interconnected by an interphase inductive winding, a group of electric valves for each of said networks, said valves each having a control electrode, a control circuit for said electrodes including means for supplying to certain electrodes of each group of valves for a time interval which is short relative to the periods of positive potential of their associated anodes potentials tending to render conductive said valves and means for supplying to at least one electrode of each group of valves for a time interval of greater duration than said first mentioned time interval potentials tending to render conductive said valves.

3. The combination comprising an alternating current circuit, a direct current load circuit, an electric valve rectifier interconnecting said circuit, said rectifier including a pair of $n$-phase networks having neutrals interconnected by an interphase inductive winding, a group of electric valves for each of said networks, said valves each having a control electrode, a control circuit for said electrodes including means for supplying to certain electrodes of each group of valves potentials tending to cause said rectifier to operate at light load conditions as a single $n$-phase rectifier, said control circuit including means for supplying to one electrode of each group of valves a potential which at light load operating conditions causes one of the valves in the inactive group of valves to become conductive whereby upon increasing load said rectifier will resume operation as two $n$-phase rectifiers in parallel.

4. The combination comprising an alternating current circuit, a direct current load circuit, an electric valve rectifier interconnecting said circuits, said rectifier including a pair of $n$-phase networks having neutrals interconnected by an interphase inductive winding, a group of valves for each of said networks, said valves each having a control electrode, a control circuit for said electrodes including means for supplying to certain electrodes of each group of valves positive potentials of short duration tending to cause said rectifier to operate at light load conditions as a single $n$-phase rectifier, said control circuit including means for supplying to one electrode of each group of valves a positive potential of greater duration which at light load operating conditions causes one of the valves in the inactive groups of valves to become conductive whereby upon increasing load upon said load circuit, said rectifier will resume operation as two $n$-phase rectifiers in parallel.

5. The combination comprising an alternating current circuit, a direct current load circuit, an electric valve rectifier interconnecting said circuits, said rectifier including a pair of $n$-phase networks having neutrals interconnected by an interphase inductive winding, a group of electric valves for each of said networks, said valves each having a control grid, a control circuit for said grids including means for supplying to certain grids of each group of valves peaked potentials and means for supplying to one grid of each group of valves a sine wave potential.

YOSHIAKI TODA.